United States Patent
Armangau et al.

(10) Patent No.: US 10,614,038 B1
(45) Date of Patent: Apr. 7, 2020

(54) INLINE DEDUPLICATION OF COMPRESSED DATA

(71) Applicant: EMC IP Holding Company LLC, Hopkinton, MA (US)

(72) Inventors: Philippe Armangau, Acton, MA (US); Jean-Pierre Bono, Westborough, MA (US); Christopher A. Seibel, Walpole, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 867 days.

(21) Appl. No.: 14/980,944

(22) Filed: Dec. 28, 2015

(51) Int. Cl.
G06F 16/174 (2019.01)
G06F 16/13 (2019.01)

(52) U.S. Cl.
CPC ........ *G06F 16/1752* (2019.01); *G06F 16/137* (2019.01); *G06F 16/1744* (2019.01)

(58) Field of Classification Search
None
See application file for complete search history.

(56) References Cited

U.S. PATENT DOCUMENTS

| | | | |
|---|---|---|---|
| 5,701,516 A | 12/1997 | Cheng et al. | |
| 8,190,850 B1 * | 5/2012 | Davenport | G06F 17/30067 711/170 |
| 2004/0220975 A1 * | 11/2004 | Carpentier | G06F 17/30097 |
| 2008/0243879 A1 * | 10/2008 | Gokhale | G06F 11/1453 |
| 2013/0097380 A1 * | 4/2013 | Colgrove | G06F 3/0608 711/118 |

OTHER PUBLICATIONS

Yannis Klonatos et al., "Transparent Online Storage Compression at the Block-Level", ACM Transactions on Storage, May 2012, 33 pages, vol. 8, No. 2, Article 5.

\* cited by examiner

*Primary Examiner* — James Trujillo
*Assistant Examiner* — John J Morris
(74) *Attorney, Agent, or Firm* — BainwoodHuang (57) ABSTRACT

A technique for performing deduplication on compressed data in a file system operates inline with storage requests, e.g., prior to writing compressed data specified in those storage requests to persistent file system structures. As requests to write data arrive, the file system compares those data with data already stored in the file system. If a match is found, metadata structures are written but compression and file system storage of the newly arrived data is avoided.

21 Claims, 4 Drawing Sheets

INLINE DEDUPLICATION OF COMPRESSED DATA

BACKGROUND

Data storage systems are arrangements of hardware and software that include one or more storage processors coupled to arrays of non-volatile storage devices, such as magnetic disk drives, electronic flash drives, and/or optical drives, for example. The storage processors service storage requests, arriving from host machines ("hosts"), which specify files or other data elements to be written, read, created, or deleted, for example. Software running on the storage processors manages incoming storage requests and performs various data processing tasks to organize and secure the data elements stored on the non-volatile storage devices.

Data storage systems commonly arrange data in structures known as file systems. Such file systems include both data and metadata. The metadata organizes the file data on disk, such that each file's data can be located, placed in proper sequence, and kept separate from other files' data.

Some file systems employ deduplication. To perform deduplication, a program searches a file system for data blocks having identical values. The program then replaces duplicate blocks with pointers to a single retained copy. Deduplication can save considerable space in file systems that store multiple copies of the same data.

SUMMARY

Conventional approaches to deduplication run in the background, where a deduplication program reads data from disk, computes digests, searches for duplicates, and reconfigures metadata when duplicates are found. Unfortunately, such background activity can result in large numbers of disk accesses, which can interfere with more critical data storage functions, especially when a data storage system is busy servicing host applications. Burdens may be even greater when working with compressed data, where deduplication activities may further require compression and decompression activities.

In contrast with the above-described prior approach, an improved technique for performing deduplication in a file system operates inline with storage requests, e.g., prior to writing data specified in those storage requests to persistent file system structures. As requests to write data arrive, the file system compares those data with data already stored in the file system. If a match is found, metadata structures are written but storage of the newly arrived data can be avoided. The improved technique thus saves both an original write of data and a subsequent read (as compared with background deduplication) when a match is found. In some examples, the file system stores data in compressed form. In such examples, performing inline deduplication can result in further savings by avoiding computationally-intensive compression of data when duplicates are found.

Certain embodiments are directed to a method of deduplicating data in a file system. The method includes receiving a request to write a set of data at a logical address of a file in the file system, looking up the set of data in a deduplication digest to identify a matching entry in the deduplication digest for the set of data, and performing an inline deduplication operation. The inline deduplication operation is performed by (i) identifying a location of a VBM (virtual block map) pointed to by the matching entry in the deduplication digest, the VBM being one of multiple VBMs pointed to by respective entries in the deduplication digest and including pointer metadata for locating a compressed version of the set of data, the compressed version of the set of data having been previously stored in the file system, and (ii) mapping the logical address of the file to the location of the VBM by writing a block pointer for the file, the block pointer being part of a tree of block pointers that map logical addresses of the file to corresponding locations in the file system.

Other embodiments are directed to a data storage system constructed and arranged to perform a method of deduplicating data in a file system, such as the method described above. Still other embodiments are directed to a computer program product. The computer program product stores instructions which, when executed on control circuitry of a data storage system, cause the data storage system to perform a method of deduplicating data in a file system, such as the method described above. Some embodiments involve activity that is performed at a single location, while other embodiments involve activity that is distributed over a computerized environment (e.g., over a network).

It should be understood that this summary is provided to familiarize the reader with features of disclosed embodiments and is not intended to define the invention hereof or to be limiting in any way.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views. The drawings are not necessarily to scale, emphasis instead being placed upon illustrating the principles of various embodiments of the invention. In the accompanying drawings.

DETAILED DESCRIPTION OF THE INVENTION

Embodiments of the invention will now be described. It is understood that such embodiments are provided by way of example to illustrate various features and principles of the invention, and that the invention hereof is broader than the specific example embodiments disclosed.

An improved technique for performing deduplication in a file system operates inline with storage requests, prior to writing data specified in those storage requests to persistent file system structures. Embodiments of the improved technique involve fewer disk accesses than conventional approaches and store data in compressed form, with the file system avoiding redundant storage as well as redundant data compression when matches to previously stored data are found.

Figure 1:
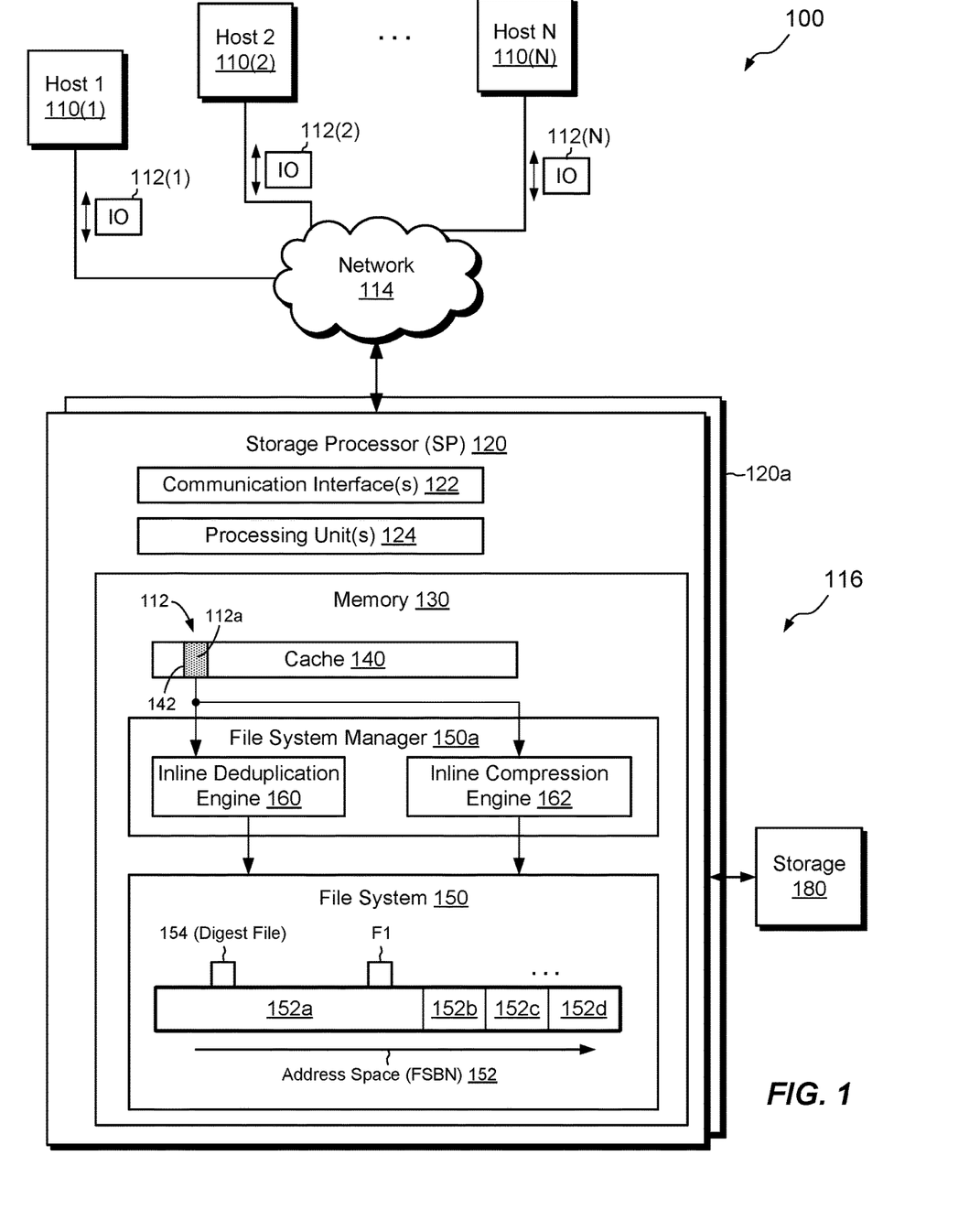
FIG. 1 is a block diagram of an example environment in which improved techniques hereof for performing inline deduplication of compressed data can be practiced.

FIG. 1 shows an example environment 100 in which embodiments of the improved technique hereof can be practiced. Here, multiple host computing devices ("hosts"), shown as devices 110(1) through 110(N), access a data storage system 116 over a network 114. The data storage system 116 includes a storage processor, or "SP," 120 and storage 180. The data storage system 116 may include multiple SPs like the SP 120 (e.g., a second SP, 120a). In an example, multiple SPs may be provided as circuit board assemblies, or "blades," which plug into a chassis that encloses and cools the SPs. The chassis has a backplane for interconnecting the SPs, and additional connections may be made among SPs using cables. It is understood, however, that no particular hardware configuration is required, as any number of SPs, including a single SP, may be provided and the SP 120 can be any type of computing device capable of processing host IOs.

In an example, the storage 180 includes multiple disk drives, such as magnetic disk drives, electronic flash drives, optical drives, and/or other types of drives. Such disk drives may be arranged in RAID (Redundant Array of Independent/Inexpensive Disks) groups, for example, or any other suitable fashion.

The network 114 may be any type of network or combination of networks, such as a storage area network (SAN), a local area network (LAN), a wide area network (WAN), the Internet, and/or some other type of network or combination of networks, for example. The hosts 110(1-N) may connect to the SP 120 using various technologies, such as Fibre Channel, iSCSI, NFS, SMB 3.0, and CIFS, for example. Any number of hosts 110(1-N) may be provided, using any of the above protocols, some subset thereof, or other protocols besides those shown. As is known, Fibre Channel and iSCSI are block-based protocols, whereas NFS, SMB 3.0, and CIFS are file-based protocols. The SP 120 is configured to receive IO requests 112(1-N) according to both block-based and file-based protocols and to respond to such IO requests 112(1-N) by reading or writing the storage 180.

The SP 120 is seen to include one or more communication interfaces 122, a set of processing units 124, and memory 130. The communication interfaces 122 include, for example, SCSI target adapters and network interface adapters for converting electronic and/or optical signals received over the network 114 to electronic form for use by the SP 120. The set of processing units 124 includes one or more processing chips and/or assemblies. In a particular example, the set of processing units 124 includes numerous multi-core CPUs. The memory 130 includes both volatile memory (e.g., RAM), and non-volatile memory, such as one or more ROMs, disk drives, solid state drives, and the like. The set of processing units 124 and the memory 130 together form control circuitry, which is constructed and arranged to carry out various methods and functions as described herein. Also, the memory 130 includes a variety of software constructs realized in the form of executable instructions. When the executable instructions are run by the set of processing units 124, the set of processing units 124 are caused to carry out the operations of the software constructs. Although certain software constructs are specifically shown and described, it is understood that the memory 130 typically includes many other software constructs, which are not shown, such as an operating system, various applications, processes, and daemons.

As further shown in FIG. 1, the memory 130 includes a cache 140, a file system 150, and a file system manager 150a. The file system manager 150a performs processing on the file system 150 and includes an inline deduplication engine 160 and inline compression engine 162. The inline deduplication engine 160 is configured to perform inline deduplication of data directed to the file system 150, and the inline compression engine 162 is configured to compress incoming data (e.g., in response to write requests) and to decompress outgoing data (e.g., in response to read requests).

The file system 150 is implemented as an arrangement of blocks (not shown), which are organized in an address space 152. Each of the blocks has a location in the address space 152, identified by FSBN (file system block number). For example, FSBN may range from zero to some large number, with each value of FSBN identifying a respective block. In an example, a block is the smallest unit of storage that the file system 150 can allocate. Blocks size may vary based on file system design, with a common block size being 8 KB. Blocks may be any suitable size, however.

As further shown in FIG. 1, the address space 152 of the file system 150 is provided in multiple sub-spaces for organizing data and different types of metadata. For example, sub-space 152a may store data (i.e., file data), sub-space 152b may store inodes, sub-space 152c may store indirect blocks (IBs), and sub-space 152d may store virtual block maps (VBMs). As is known, inodes are metadata structures that store information about files and may include pointers to IBs. IBs include pointers that point either to other IBs or to data blocks. IBs may be arranged in multiple layers, forming an IB tree, with the leaves of the IB tree including block pointers that point to data blocks. Together, the leaf IB's of a file define the file's logical address space, with each block pointer in each leaf IB specifying a logical address into the file. Virtual block maps (VBMs) are placed between block pointers of leaf IBs and respective data blocks to provide data block virtualization. The term "VBM" as used herein describes a metadata structure that has a location in a file system that can be pointed to by other metadata structures in the file system and that includes a block pointer to another location in a file system where a data block or another VBM is stored. Although distinct sub-spaces 152a to 152d are shown, it should be understood that data and metadata may be organized in other ways, or even randomly, within the file system 150. The particular arrangement shown is intended merely to be illustrative.

The file system 150 may include any number of files. Two files are shown, i.e., a file F1 and a digest file 154. The file F1 may be provided for storing host data, while the digest file 154 may be provided for assisting with inline deduplication. In a particular example, the file F1 is a container file that stores a complete realization of a host LUN (Logical Unit Number), file system, VVol (Virtual Volume), or other host-accessible data object. This is not required, however, as the file F1 may be any type of file. Although the file F1 and the digest file 154 are shown as distinct elements, it should be understood that each file is implemented with blocks of data and metadata within the address space 152 of the file system 150. The file system 150 itself is a logical representation, with blocks of the file system 150 backed by physical storage devices within storage 180.

In example operation, the hosts 110(1-N) issue IO requests 112(1-N) to the data storage system 116. The SP 120 receives the IO requests 112(1-N) at the communication interfaces 122 and initiates further processing. Here, the IO requests 112(1-N) include a request 112 that specifies a set of data 112a to be written at a known logical address within the file F1. The logical address may be included with the IO request 112 or may be implied based on other information included with the IO request 112.

Upon receiving the IO request 112, the SP 120 writes the data 112a to a location 142 in cache 140. In an example, the cache 140 is a persistent cache, such that the SP 120 may acknowledge the IO request 112 back to the requesting host once the data 112a have been stored therein. For example, the cache 140 may be implemented with battery-backed DRAM (Dynamic Random Access Memory), which is mirrored between storage processors 120 and 120a. This is merely an example, however.

With the data 112a held in cache 140, the inline deduplication engine 160 performs a look-up of the data 112a within the digest file 154. For example, the inline deduplication engine 160 executes one or more hash functions on the data 112a to generate a hash value. The inline deduplication engine 160 then applies the resulting hash value as an index into the digest file 154. The digest file 154 associates hash values, generated from respective sets of data, with respective block pointers, and the block pointers provide paths to locations in the file system 150 where the respective sets of data can be found. The term "paths" as used in this context refers to routes through metadata structures indicated by pointers or similar structures, and not to directory locations, as that term is often used. If the data 112a is a duplicate of data previously stored in the file system 150 and a matching entry for that data exists in the digest file 154, then the block pointer at the matching entry provides a path to the data 112a. In this scenario, where the digest file 154 already has a pointer to the data 112a, the file system 150 can avoid rewriting the data 112a in response to the IO request 112. Rather, the file system 150 may merely update metadata structures. For example, the file system 150 may write a block pointer in a leaf IB of F1 at the logical address specified by the IO request 112, with the value of the block pointer being the same as that of the block pointer in the digest file 154 at the matching entry.

If no matching entry is found in the digest file 154, however, then the inline compression engine 162 may compress the data 112a and the file system 150 may store the data in compressed form. In addition, the inline deduplication engine 160 may create a new entry for the data 112a in the digest file 154. The new entry includes a pointer that provides a path to the compressed version of the data 112a. Later requests to write the same data 112a to the file system 150 may be accommodated with metadata updates but without having to store duplicate copies of the data or to compress the data additional times. Efficient inline deduplication of compressed data is thereby achieved.

Figure 2:
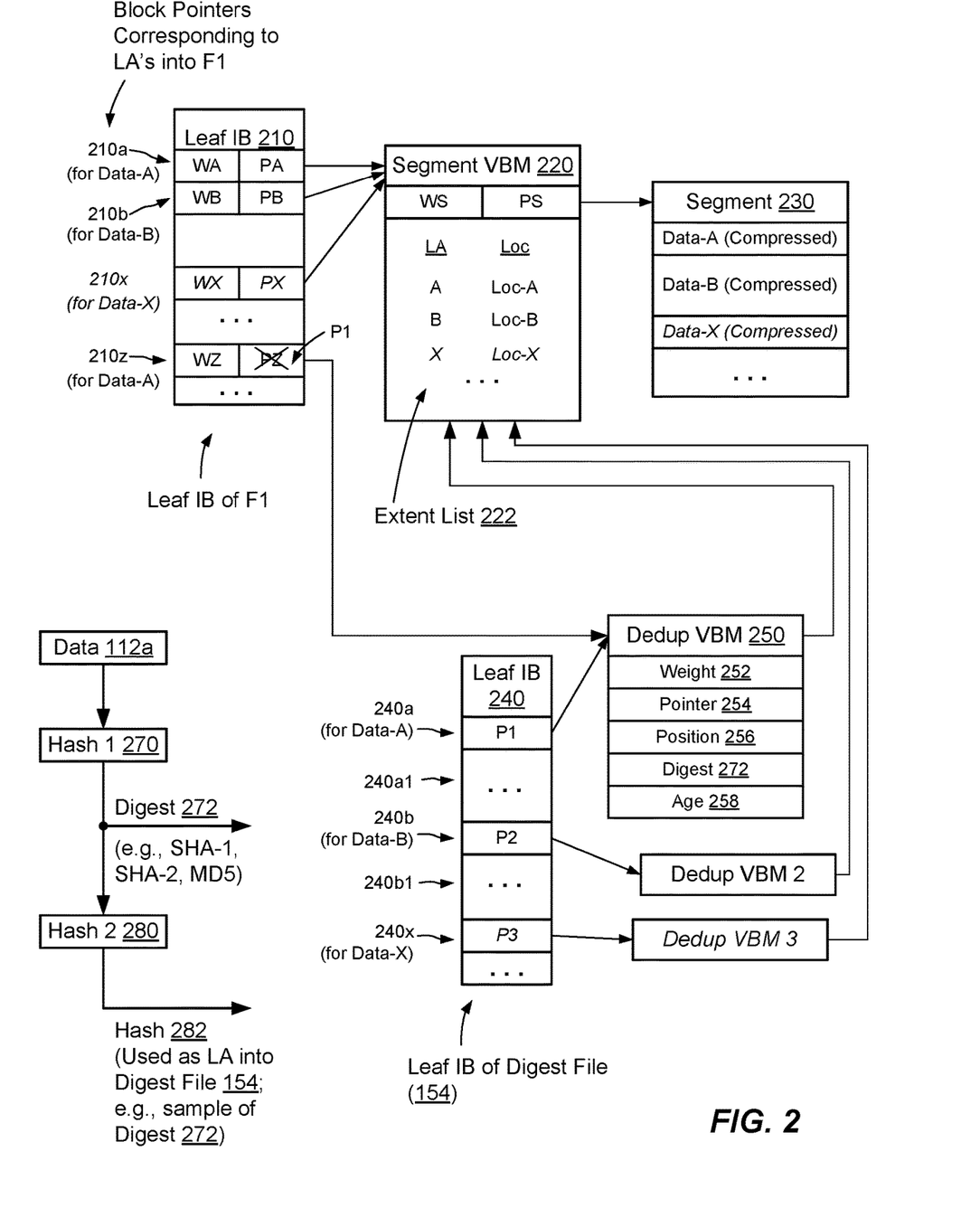
FIG. 2 is a block diagram of example data and metadata structures helpful in performing deduplication in the environment of FIG. 1.

FIG. 2 shows example file system structures involved in performing inline deduplication of compressed data. Here, a segment 230 stores multiple sets of compressed data. These include, in the example shown, a compressed version of "Data-A" and a compressed version of "Data-B." In an example, segment 230 has a predefined length, such as 64 KB. The file system 150 may employ a block size of 8 KB, for example, with segment 230 composed of 8 contiguous blocks in the address space 152 of the file system 150. The file system 150 may include any number of segments, like the segment 230, for storing respective data in compressed form. Although the segment 230 is composed from individual blocks, it is treated herein as a single space, in which sets of data may be compressed and packed together.

In an example, each compressed set of data stored in the segment 230 has an uncompressed size of 8 KB. For instance, each set of data, prior to compression, was denominated on block boundaries. This is not required, however. Also, in an example, each compressed set of data in the segment 230 corresponds to a respective logical address of a file. Thus, Data-A is file data stored at logical address "A" of a particular file and Data-B is file data of that same file at logical address "B." Such logical addresses A and B and are supported by respective block pointers in one or more leaf IBs for the file.

In the example shown, segment VBM (Virtual Block Map) 220 is a metadata structure that tracks the location of each set of data within the segment 230. For example, segment VBM 220 includes an extent list 222, which relates multiple logical addresses (LA's) to respective locations (Loc's) within the segment 230. Using the extent list 222, sets of compressed data can be found for any of the logical addresses indicated. For example, the data stored at logical address A (Data-A) may be found at Loc-A within the segment 230. Similarly, the data stored at logical address B (Data-B) may be found at Loc-B within the segment 230. In an example, the extent list 222 provides one pair of values (LA, Loc) for each set of compressed data in the segment 230. Thus, for example, if the segment 220 stores 15 sets of compressed data (corresponding to 15 original uncompressed blocks), then the extent list 222 includes 15 pairs of values.

Segment VBM 220 also includes a block pointer, PS, which points to the segment 230, and a weight, WS. The weight WS provides a reference count, e.g., a value indicating a number of metadata structures in the file system 150 that point to the segment VBM 220. Although FIG. 2 shows one segment VBM 220, which corresponds to segment 230, it should be understood that the file system 150 may provide a segment VBM for each segment stored therein, i.e., one segment VBM per segment. Each segment VBM may be stored in a block in the file system 150 (e.g., in the VBM sub-space 152d), and, depending on relative sizes, multiple segment VBMs may be stored per block.

In the example shown, the segment VBM 220 pertains to a particular file, in this case, to file F1 (see FIG. 1). As shown at the upper-left of the figure, file F1 has a leaf IB 210. The leaf IB 210 associates a set of logical addresses into F1 with respective block pointers and weights. For instance, leaf IB 210 has one location 210a that associates logical address "A" for Data-A with a block pointer PA and a weight WA. It has another location 210b that associates logical address "B" for Data-B with a block pointer PB and a weight WB. Each block pointer (PA or PB) points down a path for locating respective compressed data (Data-A or Data-B). Each weight (WA or WB) tracks a reference count of the respective block pointer (PA or PB).

With the structures described so far, it can be seen that a requestor can read the data at logical address A in file F1 by accessing the block pointer 210a in the leaf IB 210, following the pointer PA to the segment VBM 220, looking up the location of logical address "A" in the extent list 222, following the pointer PS to the segment 220, and accessing Data-A at Loc-A within the segment 230. The file system 150 may then decompress Data-A and return the decompressed data to the requestor.

Referring now to the bottom of FIG. 2, it is noted that the digest file 154 also has an IB tree, which relates logical addresses into the digest file 154 to respective block pointers. Here, a single leaf IB 240 of the digest file 154 is shown. The leaf IB 240 includes entries that associate logical addresses with respective block pointers. For example, leaf IB 240 maps a logical address at location 240a to a block pointer P1 and maps another logical address at location 240*b* to a block pointer P2. Each of the block pointers P1 and P2 points to a respective "dedup VBM," i.e., one dedup VBM per block pointer in the digest file 154. Each dedup VBM in turn points to a respective compressed set of data, e.g., via a segment VBM.

A representative dedup VBM 250 is shown in detail. Here, it is seen that dedup VBM 250 includes the following information:

Weight 252: a value indicating a reference count, e.g., a number of other metadata structures in the file system 150 that point to the dedup VBM 250.
   Pointer 254: a block pointer to a segment VBM. Each dedup VBM is specific to a respective compressed set of data, which is stored in a segment. Here, dedup VBM 250 supports Data-A, such that pointer 254 points to the segment VBM 220, which itself points to the segment 230 that stores the compressed version of Data-A.
   Position 256: The position within the pointed-to segment at which the set of data can be found. Here, Data-A is stored at the first position of segment 230. Thus, the position 256 may store a value of "1" to indicate that first position.
   Digest 272: As will be described, digest 272 is a highly discriminating hash value representative of the data stored. Here, the digest 272 is a hash of Data-A.
   Age 258: A length of time since the dedup VBM was created. This may be expressed, for example, as a timestamp or date stamp indicating a time and/or date of creation.

In some examples, each dedup VBM 250 provides a hub to which other metadata structures in the file system 150 may point for accessing a respective set of compressed data. For example, assume that an IO request specifies a write to logical address 210*z* of file F1 (see IB 210). If the set of data to be written is the same as Data-A, then the file system may map block pointer PZ (having weight WZ) directly to dedup VBM 250. Any other writes of Data-A, e.g., at other logical addresses of F1 or to any other file in the file system 150, may similarly be mapped to dedup VBM 250. Indeed, in some examples, only the first write of Data-A is mapped directly to the segment VBM 220, with subsequent writes being mapped to the dedup VBM 250. Each time a new block pointer is pointed to the dedup VBM 250, the weight 252 is updated to reflect an additional reference count. In the example shown, the weight 252 of VBM 250 reflects a reference count of two, reflecting the fact that two metadata objects point to it.

As with segment VBMs, each dedup VBM may be stored in a block in the file system 150 (e.g., in the VBM sub-space 152*d*), and, depending on relative sizes, multiple dedup VBMs may be stored per block. In some examples, the VBM sub-space 152*d* may be further divided into one sub-space for segment VBMs and another sub-space for dedup VBMs. Yet another sub-space may be provided for conventional VBMs. This is merely an example, however.

Continuing with reference to FIG. 2, once a set of data 112*a* arrives in cache 140 (FIG. 1), the inline deduplication engine 160 executes a first hash function 270 on the set of data 112*a* to generate the digest value 272 (see lower-left of FIG. 2). In an example, the first hash function 270 generates a large number of randomized bits, such that hash collisions are statistically improbable to such an extent that the risk of there being any hash collisions can be ignored. Suitable hash functions 270 may include SHA-1, SHA-2, and MD5, for example. Although the digest value 272 is much smaller than the set of data 112*a*, it can still be assumed that the digest value 272 is unique for all intents and purposes to the set of data 112*a*. Thus, it is expected that no other set of data will produce the same digest value 272 over any reasonable, finite period of time.

Although the digest value 272 is unique, it is too large to be used for logical addressing into the digest file 154. Such a digest file 154 would have an enormous logical address space, which would be impractical to implement. It has been recognized, however, that logical addressing provides a fast and efficient way to perform look-ups in a file system. To leverage this efficient structure, a second hash function 280 is provided. The second hash function 280 receives the digest value 272 as input and produces a hash value 282 as output. The hash value 282 is smaller than the digest value 272 and not as discriminating; however, its total range of values is appropriately sized for use as a logical address index into the digest file 154. For example, the hash value 282 may be 19 bits long, providing a logical address space of at least 4 GB (2^19 locations*8 KB per logical address).

In an example, the second hash function 280 may be implemented very simply, e.g., by sampling the digest value 272 every 2 or 3 bits, for example. Alternatively, the second hash function 280 may be an integer hash function or some other type of hash function. As in the example of sampled bits above, the second hash function 280 may be also a function that is not typically regarded as a hash function but becomes one by virtue of its use in this context.

Indexing into the digest file 154 then proceeds by executing the hash functions 270 and 280 on the set of data 112*a* to generate a digest value 272 and a hash value 282. The digest value 272 may be persisted in the dedup VBM 250 for future reference. The hash value 282 is applied to the digest file 154 as a logical address. In the example shown, the hash value 282 for Data-A corresponds to block pointer location 240*a* in leaf IB 240 and the hash value 282 for Data-B corresponds to block pointer location 240*b*. Although it has been described that the hash value 282 directly provides a logical address that indexes into the digest file 154, it should be understood that the hash value 282 may alternatively be further processed, such that a result of such processing provides the logical addressing index.

In an example, the second hash function 280 is arranged to provide gaps between consecutively ordered hash values. Such gaps are easily achieved, for example, by adding one or more zeros to the ends of generated binary codes. Providing gaps between consecutively ordered hash values causes corresponding gaps to appear between consecutively hash-addressable entries in the IB tree for the digest file 154. Two such gaps are shown in IB 240, i.e., gaps 240*a*1 and 240*b*1. The gaps accommodate hash collisions among hash values 282. Although hash collisions between digest values 272 are nearly impossible, they may be expected occasionally between hash values 282, which are much smaller. The gaps allow additional entries to be made in the digest file 154 in the event that multiple sets of data produce the same hash value 282 but different digest values 272. In such cases, the full digest values 272 stored in the dedup VBMs may be consulted to resolve the hash conflicts. In some examples, the size of the gaps is configurable and may depend, for example, on the amount of space available in the file system 150 for the digest file 154.

From the foregoing, it is evident that the digest file 154 in the example shown does not include file data that stores a cross-reference between hash values and respective pointers to compressed data; rather, the metadata structures forming the digest file 154 themselves provide the cross-reference. For example, the IB tree of the digest file 154 itself provides the associations between hash values, expressed as logical addresses into the digest file 154, and respective pointers to compressed data.

Figure 3:
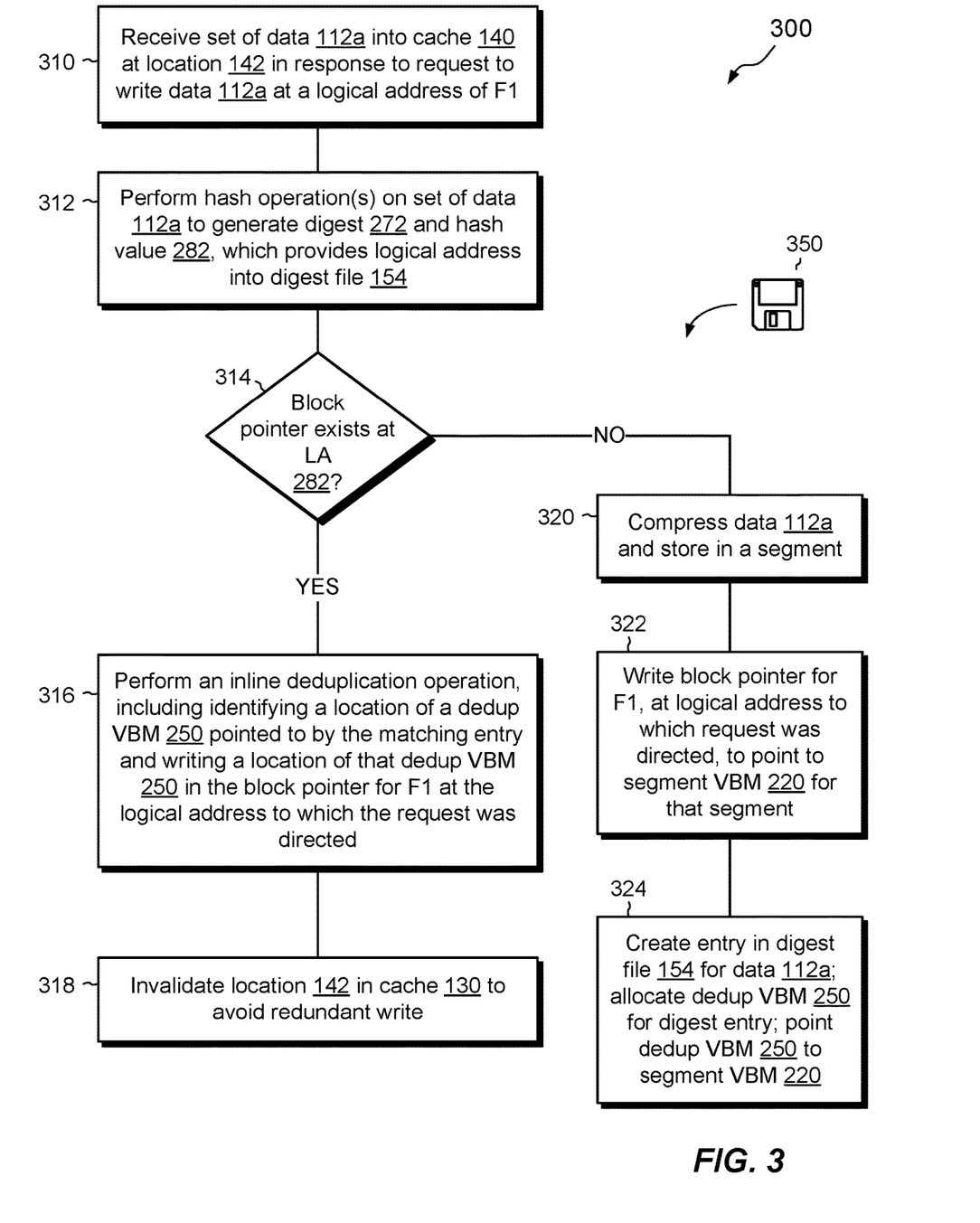
FIG. 3 is a flowchart showing an example method of responding to write requests in the environment of FIG. 1.

FIG. 3 shows an example process 300 for managing operation of a file system. The process 300 may be performed by the software constructs described in connection with FIG. 1 and by the metadata structures described in connection with FIG. 2. The various acts of the process 300 may be ordered in any suitable way. Accordingly, embodiments may be constructed in which acts are performed in orders different from those illustrated, which may include performing some acts simultaneously, even though the acts are shown as sequential in the illustrated embodiments.

At 310, a set of data 112a is received into cache 140 at cache location 142. For example, the data storage system 116 receives the IO request 112, which specifies data 112a to be written at a specified (or implied) logical address of a file, such as F1. Alternatively, the request 112 may be generated internally, i.e., within the data storage system 116. For purposes of this example, the specified (or implied) logical address corresponds to location 210z in the IB tree of F1 (see FIG. 2).

At 312, one or more hash operations are performed on the set of data 112a to generate a digest value 272 and a corresponding hash value 282. For example, the inline deduplication engine 160 executes hash function 270 (e.g., SHA-1, SHA-2, MD5, etc.) on the data 112a to generate digest value 272, and executes hash function 280 on digest value 272 to generate the hash value 282. The hash value 282 provides a logical address into the digest file 154 (e.g., directly or in via further processing). As the data 112a is the same as Data-A in this example, the hash value 282 points to location 240a, i.e., the location in the digest file 154 that tracks Data-A.

At 314, the inline deduplication engine 160 performs a look-up on the set of data 112 in the deduplication digest. For example, the inline deduplication engine 160 interrogates the block pointer location in the IB tree of the digest file 154 at the logical address given by the hash value 182 (e.g., at location 240a) to determine whether there is a matching entry. If a block pointer exists at this location, and assuming no hash collision, then a matching entry is found and the set of data 112a is already stored in the file system 150. In this example, block pointer P1 exists at location 240a; thus, location 240a is the matching entry. If a hash collision occurs, there will be multiple candidates for the matching entry and the inline deduplication engine 160 checks the digest values 272 in the dedup VBMs pointed to by these candidates to identify the true match. Operation then continues to 316.

At 316, an inline deduplication operation is performed. For example, the inline deduplication engine 160 identifies a location of a dedup VBM pointed to by the block pointer at the matching entry. In this example, pointer P1 at the matching entry 240a gives the location of dedup VBM 250. The inline deduplication engine 160 then writes the value of that pointer to a block pointer location of F1 that corresponds to the logical address that the 10 request 112 specifies (or implies). Here, the inline deduplication engine 160 writes the value of block pointer P1 in place of PZ (i.e., PZ←P1). Other acts may be performed at this time as well, such as updating the weight 252 of dedup VBM 250 to reflect an additional reference count (210z now points to dedup VBM 250 in addition to 240a).

At 318, the inline deduplication engine 160 invalidates the cache location 142 where the data 112a where temporarily stored. As the inline deduplication engine 160 found the data 112a to be a duplicate of Data-A, storing this data again in the file system 150 would be redundant. Invalidating the cache location 142 ensures that the data 112a is not compressed and stored in the file system 150 a second time. Thus, computations for performing compression and a write to disk can be avoided.

Returning now to 314, if no matching entry is found, e.g., if no block pointer exists at the logical address given by the hash value 282, then the set of data 112a is not represented in the digest file 154. This could mean, for example, that no compressed version of the data 112a currently exists in the file system 150 or that no such data is currently recognized by the digest file 154. Although this scenario does not correspond to the example described above, one can imagine a different request to write Data-X to another logical address of F1, such as one corresponding to location 210x (FIG. 2). According to this scenario, operation proceeds to 320.

At 320, the set of data 112a (Data-X, in this case) are compressed and stored in a segment, such as in segment 230 or in another segment. Assuming the compressed data are stored in segment 230, the inline deduplication engine 160 updates the extent list 222 to reflect new addition to segment 230.

At 322, a block pointer is written at the logical address location to which the new request was directed. For example, block pointer PX is written at location 210x. The value of the block pointer is made to point to the segment VBM for the segment in which the data are stored. For example, block pointer PX is made to point to segment VBM 220 for segment 230, where Data-X is stored.

At 324, a new digest entry is created in the digest file 154 for the data 112a. For example, a new entry is created for Data-X at location 240x in leaf IB 240. Also, a new dedup VDM (dedup VBM 3) is allocated for the new entry, with the new entry having a pointer P3 pointing to the new dedup VBM and the new dedup VBM pointing to the segment VBM (220) for the compressed data. Weights of the various metadata structures may be updated accordingly to reflect the new reference counts.

With the arrangement described, subsequent requests specifying writes of Data-X may result in the inline deduplication engine 160 finding a matching entry at logical address 240x, such that duplicate writes of Data-X can be avoided going forward.

Figure 4:
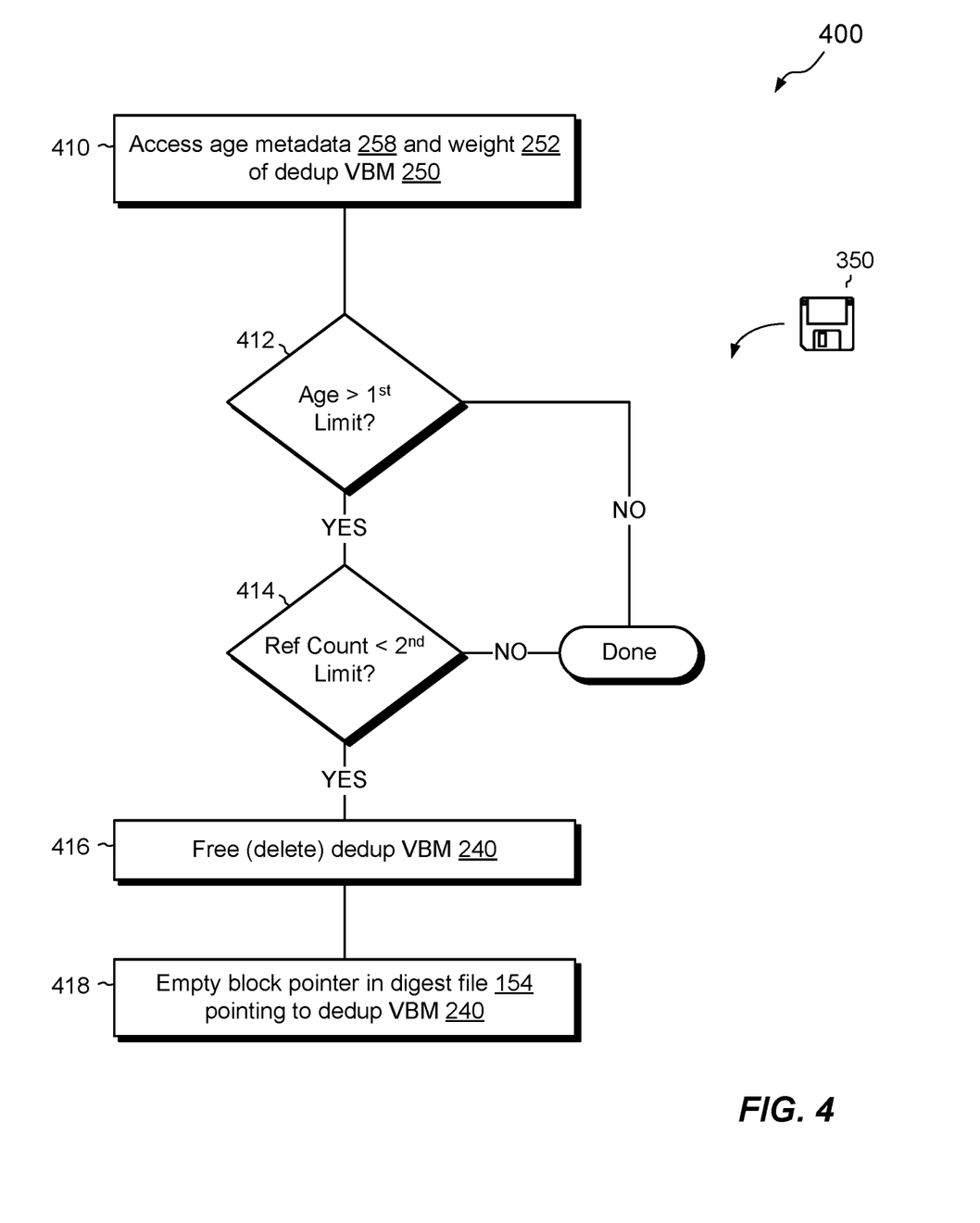
FIG. 4 is a flowchart shown an example method of managing space in a file system that uses inline deduplication.

FIG. 4 shows an example process 400 for maintaining the digest file 154 and associated dedup VBMs at a manageable size. As with the process 300, the process 400 may be performed by the software constructs described in connection with FIG. 1 and by the metadata structures described in connection with FIG. 2. Also, the various acts of the process 400 may be ordered in any suitable way. Accordingly, embodiments may be constructed in which acts are performed in orders different from those illustrated, which may include performing some acts simultaneously, even though the acts are shown as sequential in the illustrated embodiments.

At 410, the file system manager 150a interrogates a dedup VBM (e.g., 250) to access the weight 252 and age metadata 258 of that dedup VBM.

At 412, file system manager 150a compares the age metadata 258 with a first limit to determine whether the dedup VBM currently being examined has been inexistence for a period of time that exceeds the first limit. For example, the age metadata 258 is provided in the form of a timestamp or date stamp and the act 410 compares the timestamp or date stamp with a current time or date. If a resulting measure of age exceeds the first limit, then the dedup VBM may be considered a candidate for removal from the file system 150 and operation proceeds to 414.

At 414, the weight 252 of the dedup VBM is examined to determine whether the weight indicates a reference count that falls below a second limit. For example, if the dedup VBM has a reference count of one, that means that only one other metadata structure points to the dedup VBM. But since a pointer in the digest file is known to point to the dedup VBM, a reference count of one means that that set of data represented by the dedup VBM is not currently being shared. Thus, the second limit may be set to one, to indicate whether deduplication for the indicated data is in use, or it may be set to some other small value, to distinguish degrees of deduplication currently in effect.

If the results of both acts 412 and 414 are positive, then the dedup VBM may be deleted (416). For example, the dedup VBM may be cleared, freed, or otherwise made available for allocation elsewhere. Also at this time, the block pointer in the digest file 154 that points to the deleted dedup VBM may itself be freed, cleared, or otherwise removed (418). The leaf IB that contains the freed pointer in the digest file may itself eventually be freed, once all of its pointers have been removed. In this manner, the size of the digest file 154 and the number of allocated dedup VBMs may be managed.

An improved technique has been described for performing deduplication on compressed data in a file system 150. The improved technique operates inline with storage requests 112, e.g., prior to writing data 112a specified in those storage requests to persistent file system structures. As requests 112 to write data arrive, the file system 150 compares those data with data already stored in the file system 150, e.g., by performing look-ups in the digest file 154. If a match is found, metadata structures, such as block pointers in leaf IBs and reference counts in dedup VBMs, may be written but storage of the newly arrived data 112a can be avoided. The improved technique thus reduces the workload on the data storage system 116 by avoiding redundant disk accesses and by avoiding computations for compressing data. It also makes better use of storage resources by avoiding the need to provide full storage capacity for accommodating multiple copies of the same data.

Having described certain embodiments, numerous alternative embodiments or variations can be made. For example, although a particular type of digest file 154 has been shown and described, the invention hereof is not limited to this type of digest file 154 but rather may employ any type of deduplication digest, including those provided in forms other than files.

Further, although certain specific metadata structures are shown and described, nothing herein precludes other metadata structures from being used in addition to or in place of those shown. For example, additional levels of virtualization may be provided by adding other types of VBMs between dedup VBMs and segment VBMs, and/or between leaf IBs and segment VBMs. In addition, some implementations may omit the segment VBMs and point to data directly from the dedup VBMs. In addition, some implementations may omit the dedup VBMs and instead point directly from the digest file 154 to the segment VBMs.

Further, although embodiments have been described for performing inline deduplication on compressed data, other embodiments may perform inline deduplication on uncompressed data.

Also, although the segment VBM 220 as shown and described includes an extent list 222, this is merely an example. Alternatively, the extent list 222 or a similar list may be provided elsewhere, such as in the segment 230 itself (e.g., as a header).

Further, although features are shown and described with reference to particular embodiments hereof, such features may be included and hereby are included in any of the disclosed embodiments and their variants. Thus, it is understood that features disclosed in connection with any embodiment are included as variants of any other embodiment.

Further still, the improvement or portions thereof may be embodied as a computer program product including one or more non-transient, computer-readable storage media, such as a magnetic disk, magnetic tape, compact disk, DVD, optical disk, flash drive, SD (Secure Digital) chip or device, Application Specific Integrated Circuit (ASIC), Field Programmable Gate Array (FPGA), and/or the like (shown by way of example as medium 350 in FIGS. 3 and 4). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a second event may take place before or after a first event, or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

Those skilled in the art will therefore understand that various changes in form and detail may be made to the embodiments disclosed herein without departing from the scope of the invention.

What is claimed is:

1. A method of deduplicating data in a file system, the method comprising:
   receiving a request to write a set of data at a logical address of a file in the file system;
   looking up the set of data in a deduplication digest to identify a matching entry in the deduplication digest for the set of data; and
   performing an inline deduplication operation by—
      (i) identifying a location of a VBM (virtual block map) pointed to by the matching entry in the deduplication digest, the VBM being one of multiple VBMs pointed to by respective entries in the deduplication digest and including pointer metadata for locating a compressed version of the set of data, the compressed version of the set of data having been previously stored in the file system, and (ii) mapping the logical address of the file to the location of the VBM by writing a block pointer for the file, the block pointer being part of a tree of block pointers that map logical addresses of the file to corresponding locations in the file system, wherein receiving the request to write the set of data includes receiving the set of data, and wherein the inline deduplication operation completes without writing the set of data as received with the request to persistent file system structures, thereby avoiding a duplicate write of the set of data in the file system, wherein the deduplication digest includes a deduplication file, the deduplication file having a block pointer structure that associates a set of logical addresses into the deduplication file with respective block pointers, and wherein each of the respective block pointers points to a respective VBM.

2. The method of claim 1, wherein the pointer metadata in the VBM includes a pointer to a segment VBM, wherein the segment VBM includes a pointer to a storage segment, and wherein the storage segment includes a range of persistent storage that includes the compressed version of the set of data as well as compressed versions of other sets of data.

3. The method of claim 2, wherein the pointer metadata in the VBM further includes position information that indicates a position within the storage segment at which the compressed version of the set of data can be found.

4. The method of claim 3, wherein the compressed version of the set of data was previously stored in response to an earlier request to write to another logical address of the file or of another file in the file system, and wherein another block pointer in the file system corresponds to the other logical address and points to the segment VBM without pointing to the VBM.

5. The method of claim 3, wherein looking up the set of data in the deduplication digest includes:

operating one or more hash functions on the set of data to produce a hash value; and identifying the matching entry as a logical address in the block pointer structure that matches the hash value.

6. The method of claim 5, wherein operating the one or more hash functions includes:

executing a first hash function on the set of data to generate a digest value; and executing a second hash function on the digest value to generate the hash value, the hash value having fewer bits than the digest value.

7. The method of claim 6, wherein the first hash function is one of (i) SHA-1, (ii) SHA-2, and (iii) MD5.

8. The method of claim 6, wherein the second hash function is configured to leave gaps between adjacent hash values, such that corresponding gaps are provided in the digest file, and wherein a gap in the digest file stores multiple entries for which respective sets of data produce different digest values but the same hash value.

9. The method of claim 8, further comprising storing the digest value in the VBM.

10. The method of claim 3, further comprising:

receiving a new request to store a new set of data in the file or in another file in the file system;

allocating a new VBM in response to receiving the new request;

writing a new block pointer in the digest file, the new block pointer pointing to the new VBM;

maintaining both a reference count and age metadata in connection with the new VBM, the reference count indicating a number of block pointers that point to the new VBM and the age metadata indicating an age of the new VBM; and deleting the new VBM and the new block pointer in response to (i) the age metadata of the new VBM indicating an age that exceeds a first predetermined value and (ii) the reference count indicating a number of block pointers that point to the new VBM that is below a second predetermined value.

11. The method of claim 3, further comprising:

in response to receiving, in uncompressed form, a second set of data to be written to the file system, caching the second set of data in uncompressed form at a cache location;

performing a testing operation on the second set of data, the testing operation configured to (i) generate a first result when the second set of data has been previously written to the file system in compressed form and (ii) generate a second result when the second set of data has not been previously written to the file system in compressed form; and invalidating the cache location in response to the testing operation generating the first result to prevent the second set of data from being redundantly written.

12. The method of claim 1, wherein looking up the set of data in the deduplication digest includes generating a hash value from the set of data and applying the hash value as a target logical address into the deduplication file, the deduplication file providing a pointer to the VBM at the target logical address.

13. The method of claim 12, wherein the deduplication file stores the pointer to the VBM in a leaf-indirect block that maps at least a portion of the deduplication file.

14. The method of claim 13, wherein generating the hash value includes (i) producing a full hash value by performing a hash function on the set of data and (ii) producing the hash value by reducing a size of the full hash value to a scale the corresponds to a logical address range of the deduplication file.

15. A data storage system, comprising control circuitry that includes a set of processing units coupled to memory, the control circuitry constructed and arranged to:

receive a request to write a set of data at a logical address of a file in a file system;

look up the set of data in a deduplication digest to identify a matching entry in the deduplication digest for the set of data; and perform an inline deduplication operation by—

(i) identifying a location of a VBM (virtual block map) pointed to by the matching entry in the deduplication digest, the VBM being one of multiple VBMs pointed to by respective entries in the deduplication digest and including pointer metadata for locating a compressed version of the set of data, the compressed version of the set of data having been previously stored in the file system, and (ii) mapping the logical address of the file to the location of the VBM by writing a block pointer for the file, the block pointer being part of a tree of block pointers that map logical addresses of the file to corresponding locations in the file system, wherein the request to write the set of data includes the set of data, and wherein the inline deduplication operation completes without writing the set of data as received with the request to persistent file system structures, thereby avoiding a duplicate write of the set of data in the file system,
wherein the deduplication digest includes a deduplication file, the deduplication file having a block pointer structure that associates a set of logical addresses into the deduplication file with respective block pointers, and
wherein each of the respective block pointers points to a respective VBM.

16. A computer program product including a set of non-transitory, computer-readable media having instructions which, when executed by control circuitry of a data storage system, cause the control circuitry to perform a method of deduplicating data in a file system, the method comprising:
receiving a request to write a set of data at a logical address of a file in the file system;
looking up the set of data in a deduplication digest to identify a matching entry in the deduplication digest for the set of data; and
performing an inline deduplication operation by—
(i) identifying a location of a VBM (virtual block map) pointed to by the matching entry in the deduplication digest, the VBM being one of multiple VBMs pointed to by respective entries in the deduplication digest and including pointer metadata for locating a compressed version of the set of data, the compressed version of the set of data having been previously stored in the file system, and
(ii) mapping the logical address of the file to the location of the VBM by writing a block pointer for the file, the block pointer being part of a tree of block pointers that map logical addresses of the file to corresponding locations in the file system,
wherein receiving the request to write the set of data includes receiving the set of data, and wherein the inline deduplication operation completes without writing the set of data as received with the request to persistent file system structures, thereby avoiding a duplicate write of the set of data in the file system,
wherein the deduplication digest includes a deduplication file, the deduplication file having a block pointer structure that associates a set of logical addresses into the deduplication file with respective block pointers, and
wherein each of the respective block pointers points to a respective VBM.

17. The computer program product of claim 16, wherein the pointer metadata in the VBM includes a pointer to a segment VBM, wherein the segment VBM includes a pointer to a storage segment, and wherein the storage segment includes a range of persistent storage that includes the compressed version of the set of data as well as compressed versions of other sets of data.

18. The computer program product of claim 17, wherein looking up the set of data in the deduplication digest includes:

operating one or more hash functions on the set of data to produce a hash value; and
identifying the matching entry as a logical address in the block pointer structure that matches the hash value.

19. The computer program product of claim 18, wherein operating the one or more hash functions includes:
executing a first hash function on the set of data to generate a digest value; and
executing a second hash function on the digest value to generate the hash value, the hash value having fewer bits than the digest value,
wherein the second hash function is configured to leave gaps between adjacent hash values, such that corresponding gaps are provided in the digest file, and
wherein a gap in the digest file stores multiple entries for which respective sets of data produce different digest values but the same hash value, and
wherein the method further comprises storing the digest value in the VBM.

20. The computer program product of claim 17, wherein the method further comprises:
receiving a new request to store a new set of data in the file or in another file in the file system;
allocating a new VBM in response to receiving the new request;
writing a new block pointer in the digest file, the new block pointer pointing to the new VBM;
maintaining both a reference count and age metadata in connection with the new VBM, the reference count indicating a number of block pointers that point to the new VBM and the age metadata indicating an age of the new VBM; and
deleting the new VBM and the new block pointer in response to (i) the age metadata of the new VBM indicating an age that exceeds a first predetermined value and (ii) the reference count indicating a number of block pointers that point to the new VBM that is below a second predetermined value.

21. The computer program product of claim 17, wherein the method further comprises:
in response to receiving, in uncompressed form, a second set of data to be written to the file system, caching the second set of data in uncompressed form at a cache location;
performing a testing operation on the second set of data, the testing operation configured to (i) generate a first result when the second set of data has been previously written to the file system in compressed form and (ii) generate a second result when the second set of data has not been previously written to the file system in compressed form; and
invalidating the cache location in response to the testing operation generating the first result to prevent the second set of data from being redundantly written.

* * * * *